US010853578B2

(12) United States Patent
Dev et al.

(10) Patent No.: US 10,853,578 B2
(45) Date of Patent: Dec. 1, 2020

(54) EXTRACTING UNCONSCIOUS MEANING FROM MEDIA CORPORA

(71) Applicant: MachineVantage, Inc., Piedmont, CA (US)

(72) Inventors: Ratnakar Dev, San Rafael, CA (US); Anantha K. Pradeep, Piedmont, CA (US)

(73) Assignee: MACHINEVANTAGE, INC., Berkeley, CA (US)

(*) Notice: Subject to any disclaimer, the term of this patent is extended or adjusted under 35 U.S.C. 154(b) by 126 days.

(21) Appl. No.: 16/165,989

(22) Filed: Oct. 19, 2018

(65) Prior Publication Data

US 2020/0050668 A1    Feb. 13, 2020

Related U.S. Application Data

(60) Provisional application No. 62/717,302, filed on Aug. 10, 2018.

(51) Int. Cl.
*G06F 40/00* (2020.01)
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC .......... G06F 17/2785; G06F 17/30867; G06F 17/3053; G06F 17/30554; G06F 40/211; G06F 40/289; G06F 40/247; G06F 40/216; G06F 40/35; G06F 40/279; G06N 99/005; G06Q 30/0201; G10L 25/63; G10L 15/22; G10L 15/1815
See application file for complete search history.

(56) References Cited

U.S. PATENT DOCUMENTS

2007/0073745 A1* 3/2007 Scott .................... G06F 16/374
2009/0326947 A1* 12/2009 Arnold .................. G06Q 30/02
704/257

(Continued)

OTHER PUBLICATIONS

Gutierrez, E. D., Cecchi, G. A., Corcoran, C., & Corlett, P. (2017). Using automated metaphor identification to aid in detection and prediction of first-episode schizophrenia. In Proceedings of the 2017 Conference on Empirical Methods in Natural Language Processing (pp. 2923-2930).*

(Continued)

*Primary Examiner* — Edgar X Guerra-Erazo
(74) *Attorney, Agent, or Firm* — Kwan & Olynick LLP

(57) ABSTRACT

Provided are systems, methods, and devices for extracting unconscious meaning from media corpora. One or more corpora are received from one or more media databases. A number of phrases are extracted from the corpora, and then disambiguated according to natural language processing methods. One or more criteria are then selected to be used for phrase analysis, and the phrases are then analyzed to extract unconscious meaning based on the one or more criteria. The phrase analysis involves machine learning or predictive analysis methods. The results of the phrase analysis are then provided to one or more client devices, with the results containing findings of unconscious meaning for the phrases.

11 Claims, 6 Drawing Sheets

(56) References Cited

U.S. PATENT DOCUMENTS

| | | | | |
|---|---|---|---|---|
| 2010/0153324 A1* | 6/2010 | Downs | ............ | G06F 40/258 |
| | | | | 706/21 |
| 2013/0254144 A1* | 9/2013 | Heidasch | ............ | G06N 3/084 |
| | | | | 706/13 |
| 2015/0081277 A1* | 3/2015 | Behi | ............ | G06F 40/205 |
| | | | | 704/9 |
| 2016/0140588 A1* | 5/2016 | Bracewell | ............ | G06Q 30/0204 |
| | | | | 705/7.33 |
| 2018/0189691 A1* | 7/2018 | Oehrle | ............ | G06Q 10/063 |
| 2018/0336183 A1* | 11/2018 | Lee | ............ | G06F 40/30 |
| 2019/0311384 A1* | 10/2019 | Bracewell | ............ | G06Q 30/0204 |
| 2019/0370337 A1* | 12/2019 | Lee | ............ | G06N 5/04 |

OTHER PUBLICATIONS

Yonatan Belinkov and James Glass, "Analysis Methods in Neural Language Processing: A Survey," vol. 7, pp. 49-72, 2019.
Tom Young et al., "Recent Trends in Deep Learning Based Natural Language Processing," arXiv preprint arXiv:1708.02709v8, 2018.

* cited by examiner

| Relationship | Example 1 | Example 2 | Example 3 |
|---|---|---|---|
| France - Paris | Italy: Rome | Japan: Tokyo | Florida: Tallahassee |
| big - bigger | small: larger | cold: colder | quick: quicker |
| Miami - Florida | Baltimore: Maryland | Dallas: Texas | Kona: Hawaii |
| Einstein - scientist | Messi: midfielder | Mozart: violinist | Picasso: painter |
| Sarkozy - France | Berlusconi: Italy | Merkel: Germany | Koizumi: Japan |
| copper - Cu | zinc: Zn | gold: Au | uranium: plutonium |
| Berlusconi - Silvio | Sarkozy: Nicolas | Putin: Medvedev | Obama: Barack |
| Microsoft - Windows | Google: Android | IBM: Linux | Apple: iPhone |
| Microsoft - Ballmer | Google: Yahoo | IBM: McNealy | Apple: Jobs |
| Japan - sushi | Germany: bratwurst | France: tapas | USA: pizza |

FIG. 4A

| Newspapers | | | |
|---|---|---|---|
| New York | New York Times | Baltimore | Baltimore Sun |
| San Jose | San Jose Mercury News | Cincinnati | Cincinnati Enquirer |
| NHL Teams | | | |
| Boston | Boston Bruins | Montreal | Montreal Canadiens |
| Phoenix | Phoenix Coyotes | Nashville | Nashville Predators |
| NBA Teams | | | |
| Detroit | Detroit Pistons | Toronto | Toronto Raptors |
| Oakland | Golden State Warriors | Memphis | Memphis Grizzlies |
| Airlines | | | |
| Austria | Austrian Airlines | Spain | Spanair |
| Belgium | Brussels Airlines | Greece | Aegean Airlines |
| Company executives | | | |
| Steve Ballmer | Microsoft | Larry Page | Google |
| Samuel J. Palmisano | IBM | Werner Vogels | Amazon |

FIG. 4B

Table 1: Input term "Tea" — 510

| Top 20 Rankings | |
|---|---|
| Topic | Ranking |
| Tea (disambiguation) | 1 |
| Tea | 2 |
| Tea (meal) | 3 |
| Oolong | 4 |
| Triethylamine | 5 |
| Health effects of Tea | 6 |
| Camellia sinensis | 7 |
| Gongfu tea ceremony | 8 |
| Oxalate | 9 |
| Theanine | 10 |
| Earl Grey tea | 11 |
| Tetraethylammonium | 12 |
| Herbal Tea | 13 |
| Kukicha | 14 |
| Yogi Tea | 15 |
| Camellia | 16 |
| Tetraethylammonium chloride | 17 |
| Black tea | 18 |
| Noon chai | 19 |
| Masala chai | 20 |

Table 2: Input term "Fear" — 520

| Top 25 Rankings | |
|---|---|
| Topic | Ranking |
| Fear (disambiguation) | 1 |
| Horror and terror | 2 |
| Fear (1996 film) | 3 |
| Terror (disambiguation) | 4 |
| F.E.A.R (tv series) | 5 |
| Phobia | 6 |
| Terror (politics) | 7 |
| List of phobias | 8 |
| Anxiety | 9 |
| Terror (band) | 10 |
| Fear (band) | 11 |
| Specific phobia | 12 |
| Horror film | 13 |
| Social anxiety disorder | 14 |
| F.E.A.R | 15 |
| Somatic anxiety | 16 |
| Amygdala | 17 |
| Fight-or-flight response | 18 |
| The Terror (disambiguation) | 19 |
| Rumination (psychology) | 20 |
| Agoraphobia | 21 |
| Horror fiction | 22 |
| Nightmare | 23 |
| Butterflies in stomach | 24 |
| The Terror (1963 film) | 25 |

*FIG. 5*

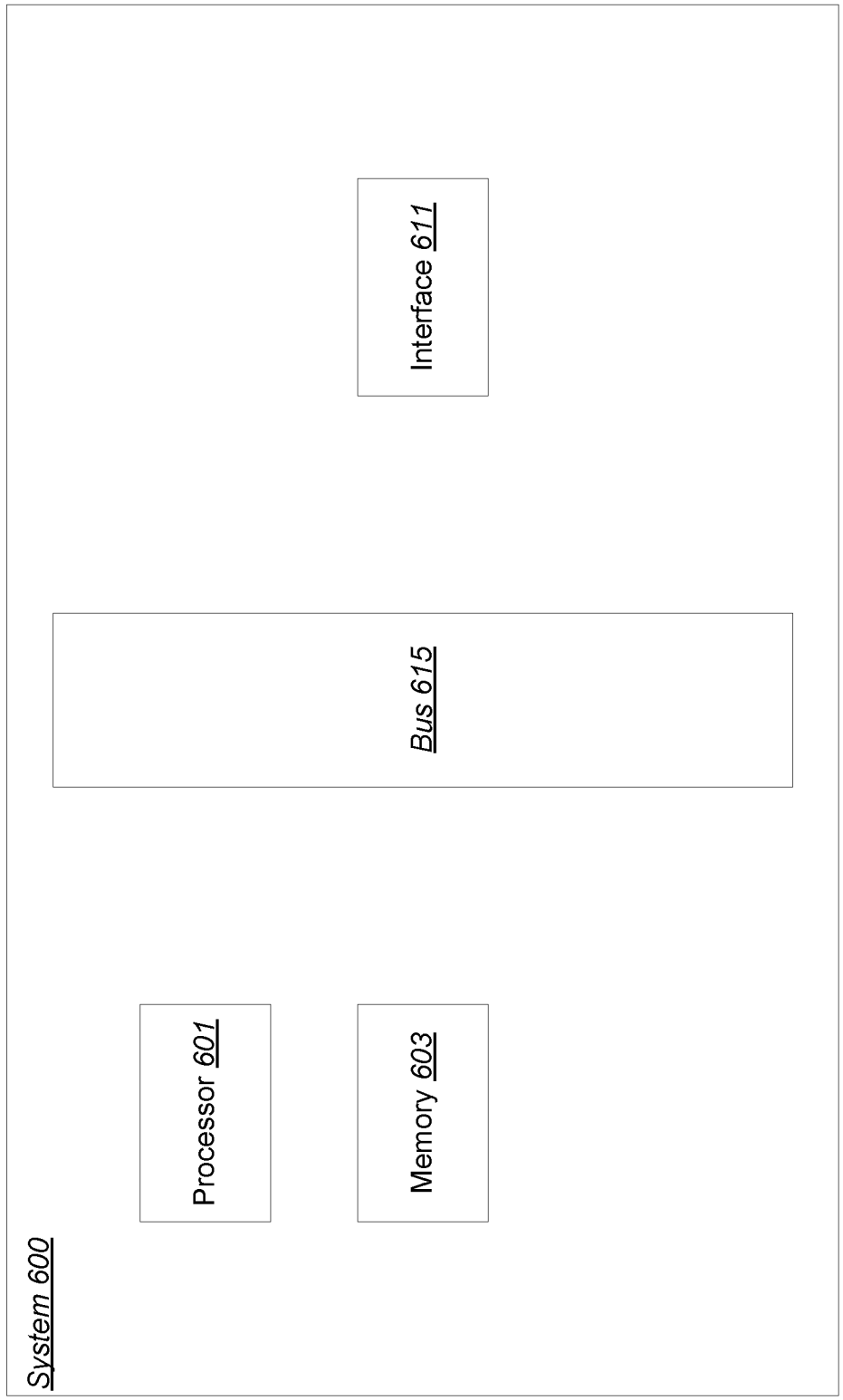

EXTRACTING UNCONSCIOUS MEANING FROM MEDIA CORPORA

CROSS-REFERENCE TO RELATED APPLICATIONS

This application claims the benefit under 35 U.S.C. § 119(e) of U.S. Provisional Patent Application No. 62/717,302, filed on Aug. 10, 2018, and titled, "Extracting Unconscious Meaning From Media Corpora," which is incorporated by reference herein in its entirety for all purposes

TECHNICAL FIELD

The present disclosure relates generally to natural language processing and linguistic analysis, and more specifically, to extracting unconscious meaning from media corpora.

BACKGROUND

In marketing, one is often tasked with generating product ideas, slogans, and innovations based on aggregated data associated with consumer behavior. Furthermore, marketers often look to generate ideas which incorporate topical and semantic relatedness to brand keys or high-level concepts. From a neurocognitive perspective, consumers are predisposed to look favorably on marketing campaigns which tap into their subconscious biases and desires.

Linguists and neurocognitive scientists are often interested in scientific models that are capable of capturing semantics and meaning. In the case of marketers and advertisers, there is vast potential in using these scientific models to analyze semantics and meaning of various corpora and media and to use the results for advertising and marketing research. From a neuroscience perspective, one can analyze corpora to ascertain motivations of the human mind, learn about the origins of human language, and apply computational linguistics to problems of meaning and communication.

One can classify the inputs for these models as either conscious or unconscious inputs, otherwise referred to here as conscious or unconscious meaning. Conscious inputs may include text, such as online knowledge databases, or media, such as movies, songs, television shows, and online videos. Conscious inputs may also include social media posts and interactions. Conscious inputs, or conscious meaning, may include ideas, phrases, memes, and concepts originating from media and text. Unconscious inputs or unconscious meaning, by contrast, may include unconscious concepts and desires for one's inner neural framework of desire. Unconscious inputs elucidating unconscious desires, feelings, and ideas may exist for an individual, a team, a demographic, an entire generation, an entire population, or other group. There is a great deal that marketers, brand design teams, advertising agencies, and others can learn from unconscious inputs which arise from conscious inputs such as media.

SUMMARY

Provided are systems, methods, and devices for extracting unconscious meaning from media corpora. One or more corpora are received from one or more media databases. A number of phrases are extracted from the corpora, and then disambiguated according to natural language processing methods. One or more criteria are then selected to be used for phrase analysis, and the phrases are then analyzed to extract unconscious meaning based on the one or more criteria. In some embodiments, the phrase analysis involves machine learning or predictive analysis methods. The results of the phrase analysis are then provided to one or more client devices, with the results containing findings of unconscious meaning for the phrases.

BRIEF DESCRIPTION OF THE DRAWINGS

FIG. 4A illustrates example results of a word vector model for determining semantic meaning, implemented in accordance with some embodiments.

FIG. 4B illustrates additional example results of a word vector model for determining semantic meaning, implemented in accordance with some embodiments.

FIG. 5 illustrates example results of determining topical similarity, implemented in accordance with some embodiments.

FIG. 6 illustrates an example of a computer system that can be used with various embodiments.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

The systems, methods, and devices provided herein are concerned with extracting unconscious meaning from media corpora. This is accomplished by extracting phrases from the media corpora, and applying one or more lenses to analyze the phrases to extract unconscious meaning from them.

Figure 1:
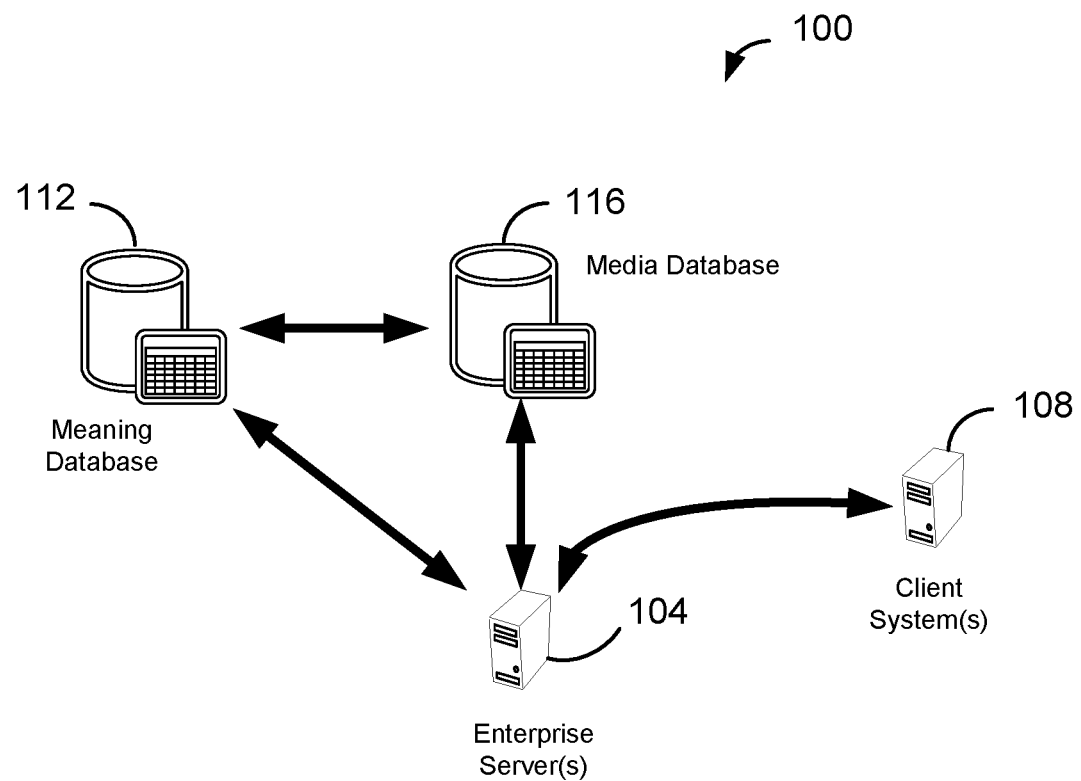
FIG. 1 shows a system diagram for extracting unconscious meaning from media corpora, configured in accordance with some implementations.

FIG. 1 shows a system diagram of an example of a system 100 for extracting unconscious meaning from media corpora, in accordance with some implementations. System 100 includes a variety of different hardware and/or software components which are in communication with each other. In the non-limiting example of FIG. 1, system 100 includes at least one enterprise server 104, at least one client system 108, at least one meaning database 112, and at least one media database 116.

The meaning database 112 can be a database implemented in a relational or non-relational database management system. The meaning database 112 allows for storage, maintenance, and retrieval of data, records, and/or statistics related to meaning within one or more media corpora. In some embodiments, the meaning database 112 contains unconscious meaning, and in some embodiments the meaning database 112 contains both unconscious meaning and conscious meaning. In some embodiments, conscious meaning can include text, such as online knowledge databases, or media, such as movies, songs, television shows, and online videos. Conscious meaning may also include social media posts and interactions. Conscious meaning may include ideas, phrases, memes, and concepts originating from media and text. In some embodiments, unconscious meaning includes unconscious concepts and desires for one's inner neural framework of desire. This may take the form of text, phrases, concepts, ideas, data, statistics, graphs and other visual data, and more.

The media database 116 can be a database implemented in a relational or non-relational database management system. In some embodiments, this database can include the contents of one or more knowledge databases, or searchable repositories of knowledge or information. For example, the media database can include a media corpus such as a Wikipedia database containing the entries, records, and/or articles constituting the Wikipedia corpus of accessible text. In some embodiments, the media database 116 can include the text or audio of songs, movie scripts or video, images, television scripts or video, artwork, advertisements, billboards, interactive media, video games, virtual reality spaces or experiences, or any other form of media.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the meaning database 112 or the media database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device, an optical head-mounted display (OHMD) device, a smart watch, etc. Client system 108 includes at least one browser in which applications may be deployed.

Figure 2:
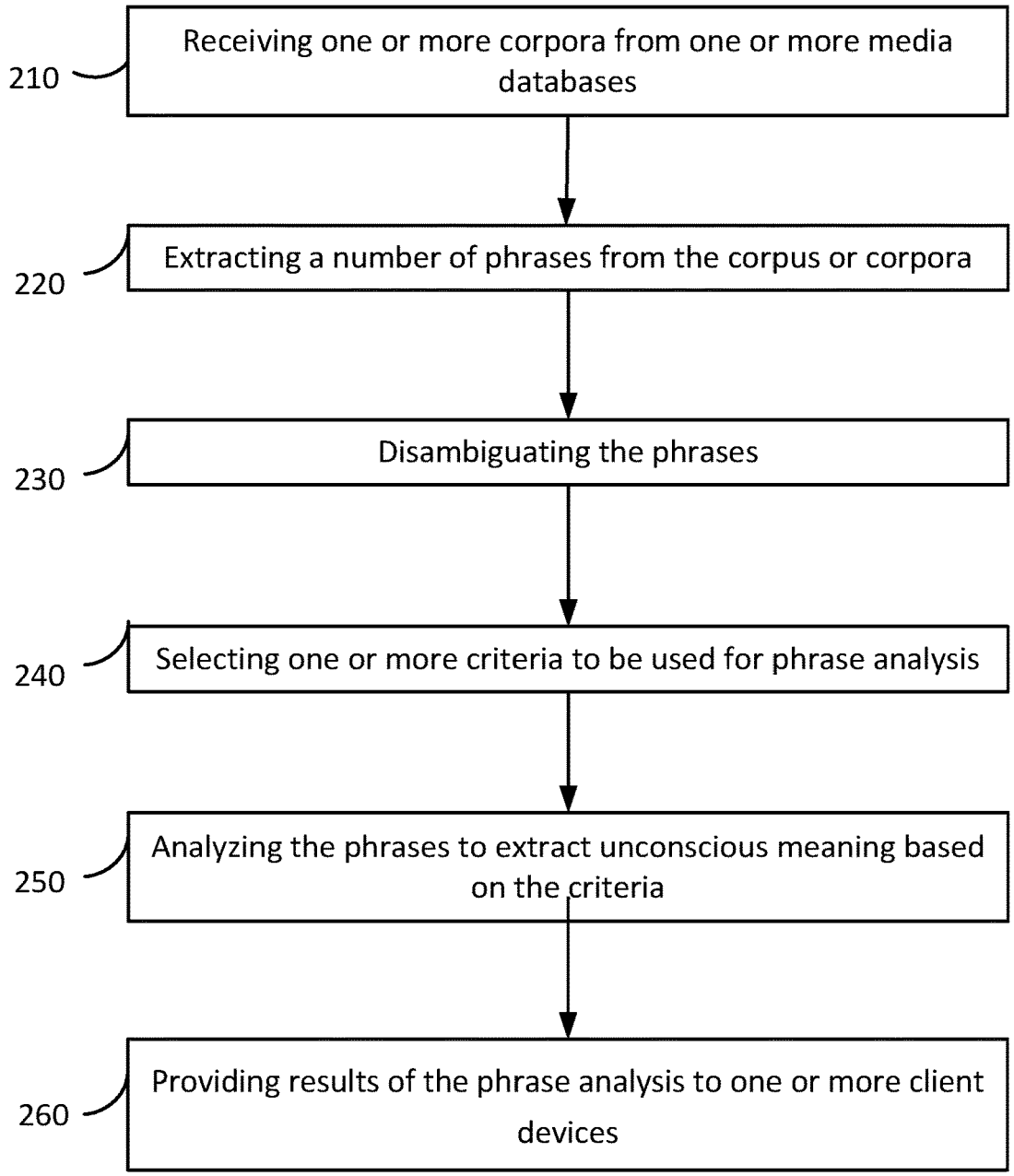
FIG. 2 illustrates a flow chart of a method for extracting unconscious meaning from media corpora, implemented in accordance with some embodiments.

FIG. 2 illustrates an example of a flow chart of a method for extracting unconscious meaning from media corpora, implemented in accordance with some embodiments. As discussed above, various components of system 100 may be configured to implement the extraction of unconscious meaning from media corpora.

At block 210, system 100 receives one or more corpora from one or more media databases. In some embodiments, the one or more media databases may include media database 116. In some embodiments, the corpora may be a media corpus such as the full text of a recent movie, the lyrics of the current top 10 singles chart, audiovisual media for a trending video, or some other media. In some embodiments, system 100 receives the one or more corpora once it is sent or signaled by a client device. For example, a client device operated by a market researcher may send media to system 100 in order to extract meaning from it.

At block 220, system 100 extracts a number of phrases from the corpus or corpora. In some embodiments, "phrases" may include textual characters, words, combinations of words, speech, audio or segments of audio, video or segments of video, concepts, ideas, memes, engrams, and more. In some embodiments, phrases can include sequences of characters, such as emojis. In some implementations, phrase extraction can be considered the equivalent of acquiring sources pertinent to a particular problem domain.

At block 230, system 100 disambiguates the phrases. In some embodiments, word-sense disambiguation is performed. Disambiguation involves identifying which meaning of a given phrase is being used in that context, from multiple potential meanings for the phrase. In some embodiments, disambiguating the phrases is performed using natural language processing methods and techniques. In some embodiments, the process of disambiguation involves resolving ambiguities within the phrases.

Figure 3:
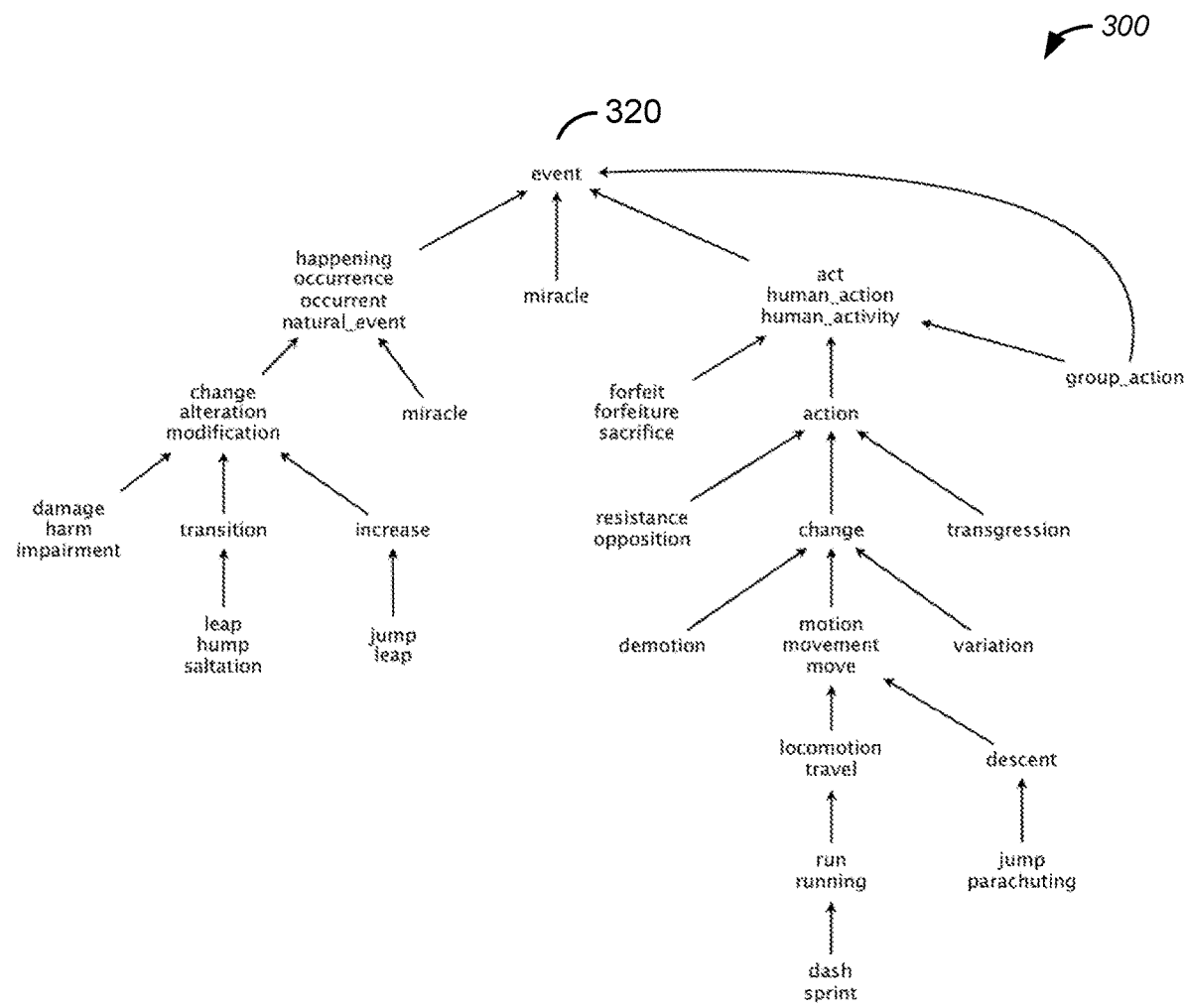
FIG. 3 illustrates a hierarchical representation of words, implemented in accordance with some embodiments.

In some embodiments, a vector-based natural language processing model is used for disambiguating the phrases, using hierarchical sources for information ("word vector model" as described herein). In some embodiments, the model is vector-assisted with one or more pieces of additional information as an input. In some embodiments, the additional information includes human-curated pieces of information. In some embodiments, the disambiguation involves one or more machine learning processes. FIG. 3 shows a simple diagram 320 of a hierarchical representation of words 300 using WordNet. In the diagram, the most abstracted words, such as "event" are at the top, and more specific examples of the abstracted events appear further down in the diagram. For example, one can drill down into a more specific iteration of an "event" as follows in order from abstract to specific: event, act, action, change, motion, descent, parachuting.

In some embodiments, a vector-based model is used in combination with machine learning techniques. In some embodiments, the machine learning processes determine whether and how hierarchical sources of information are to be used in disambiguation. One example of these hierarchical sources of information is "synsets", which are human-curated synonyms that are grouped into unordered sets. Each synset is linked to other synsets by means of a small number of conceptual relations. Additionally, a synset contains a brief definition and one or more short sentences. Word forms with several distinct meanings are represented in as many distinct synsets. Thus, each form-meaning pair is unique. In this fashion, for disambiguation, system 100 can analyze hierarchical pairs such as synsets and determine whether words are close or far apart.

In some embodiments, word vector models (e.g., Word2vec) can be used to disambiguate the phrases. This is described in FIGS. 4A and 4B (word vector model for determining semantic meaning). In some embodiments, one or more word vector models can be trained to reconstruct linguistic contexts of words. Based on a corpus, word vector models can produce a vector space, with each unique word in the corpus being assigned a corresponding vector in the space. Word vectors are positioned in the vector space such that words that share common contexts in the corpus are located in close proximity to one another in the space. One example of a set of word vector models is Word2vec.

Returning to FIG. 2, at block 240, system 100 selects one or more criteria, also referred to as lenses, to be used for phrase analysis. Criteria are ways for processing and determining meaning based on specific categories, segments, demographics, contexts, and similar divisions. One such criterion is to analyze meaning based on the market for "luxury" brands, distinguishing from "fun" less expensive brands. For example, a premium ice cream with premium ingredients may be deemed to qualify for "luxury" criteria, as opposed to a budget brand ice cream.

In some embodiments, demographics are potential criteria (or lens) as well. For example, "millennials" as a generational segment may be a criterion that is defined within one or more definitional databases, knowledge databases, or sets of training data. System 100 selects the "millennial" demographic as a criterion for analysis of meaning of the phrases. In some embodiments, the criteria are pre-selected. In some embodiments, the criteria are user-selected or customized for a specific user. In some embodiments, a graphical interface is presented on one or more client devices allowing one or more users to see and modify criteria selections, including adding and removing criteria or lenses.

In some embodiments, cultural lenses may be criteria. In some embodiments, cultural lenses are meanings, shared understandings, and contexts for words, phrases, ideas, and more that are specific to a particular geographic region, country, continent, or cultural group. In some embodiments, semantic clusters of words can capture specific meanings based on cultural differences. For example, the word "freedom" may be understood differently by residents of one country relative to residents of another country, depending on censorship laws, shared values within the country, and more.

At block 250, system 100 analyzes the phrases using the criteria to extract unconscious meaning based on the selected criteria. In some embodiments, system 100 analyzes the phrases by retrieving word-pair relations, concept relations, context, and more from databases associated with the selected criteria. In some embodiments, the nature of the phrase analysis depends on the criteria that system 100 selected. For example, if one of the selected criteria is the demographic group "millennials", then system 100 can retrieve a number of databases that provide shared sets of meaning and relation among millennials as a group to a number of words, phrases, and contexts. In analyzing the phrases to extract the unconscious meaning that millennials have for the phrases, those databases pertaining to millennials can be used for word relations, concept relations, context, and more.

In some embodiments, system 100 further analyzes the phrases by retrieving engagement data related to the selected criteria. For example, if "millennials" was a demographic criterion selected, then system 100 retrieves engagement data for various social media sites related to the phrases, concepts or words related to the phrases, and/or other terms. In some embodiments, in terms of engagement data, both conscious and unconscious data can be used to analyze the phrases and extract unconscious meaning. For example, if many people tweet the equivalent of "I love Roll deodorant" regarding a given brand, then that would be conscious engagement data. On the other hand, unconscious engagement data would involve, e.g., no mention of the product, but rather what the product embodies. For example, if several people tweet the equivalent of "I'm so sweaty I have to use Roll", then that unconscious engagement data can be used to analyze phrases and acquire unconscious meaning for the phrases.

In some embodiments, system 100 analyzes the phrases using machine learning or predictive analysis techniques. In some embodiments, a machine learning engine or predictive analysis engine may use training sets of data in order to analyze the phrase to extract unconscious meaning. In some embodiments, the training sets of data may include historical data of past phrase analyses, social media engagement, predictive results of unconscious meaning based on expected results, and more.

At block 260, system 100 provides results of the phrase analysis to one or more client devices. In some embodiments, the results consist of the findings of unconscious meaning for the phrases. In some embodiments, the results consist of further extrapolations based on those findings of unconscious meaning. For example, system 100 can provide a table of unconscious meanings found for given phrases in a movie script based on the demographic "Baby Boomers" and the cultural lenses "United States" and "California". System 100 can further provide insight into how to use these unconscious meanings to target marketing campaigns towards Baby Boomers in California.

In some embodiments, system 100 extracts one or more metaphors from the phrase analysis and provides these metaphors to the client devices along with the results of the phrase analysis. For example, system 100 may extract the metaphor "Grim Reaper" from the phrase analysis and provide it to the client devices. In some embodiments, system 100 can also provide unconscious meanings for the metaphors based on the selected criteria. For example, "Grim Reaper" may be determined to have the unconscious meaning of "sign of impending death" for a given demographic, and "scythe" may have the unconscious meaning of "cutting down something in its prime" for the demographic. Providing metaphors and their meanings based on media corpora can often be useful to marketers in utilizing those metaphors in marketing campaigns.

FIG. 4A and FIG. 4B illustrate example results of a word vector model for determining semantic meaning, implemented in accordance with some embodiments. In some embodiments, the word vector model used may be Word2Vec, including the Continuous Bag of Words model and the Skip-gram model. Other vector-based word models may be used. System 100 can use a vector-based word model for disambiguating phrases, analyzing phrases for unconscious meaning, and more. One example of using a word vector model for determining semantic meaning is when applying criteria during analysis of a phrase. For example, given sufficient data about millennials' response to the word "freedom" used in hundreds of movie scripts and commercials, the model may be able to accurately fill in an expected response from millennials to the use of the word "freedom" in one specific instance of a commercial.

FIG. 4A shows example results 420 of word pair relationships using word vectors. In this example, the Skip-gram model has been trained on a large text corpus. Given the input relationship "France-Paris", and then the three inputs "Italy", "Japan", and "Florida", the word vector model is able to output "Italy: Rome", "Japan: Tokyo", and "Florida: Tallahassee", thus accurately surmising the correct capital relationships for these three locations. Several other input relationships and examples are shown.

FIG. 4B shows additional example results 440 of word pair relationships using word vectors. Given the relationship pair "New York: New York Times; San Jose: ?" the word vector model outputs the result "San Jose Mercury News". Similarly, given the relationship pair "Detroit: Detroit Pistons; Oakland: ?" the result "Golden State Warriors" is determined, showing that the model correctly assess the semantic meaning intended in the relationship pair, instead of just looking for a similarity match with the word "Oakland" in it.

FIG. 5 illustrates an example 500 of topical similarity rankings for received input terms, implemented in accordance with some embodiments. In some embodiments, topical similarity rankings or determinations are used to analyze phrases based on one or more criteria, disambiguating phrases, and more. In the example 500, two tables for received input terms show ranking results denoting topical similarity to the input term compared to other entries, phrases, or words within one or more corpora. The first table 510 shows topical similarity rankings for the received input term "Tea". Based on the process as described above, the output for the topical similarity results reveals that the disambiguation page for "Tea" is the most similar to the input search term, followed by the entries "Tea" and "Tea (meal)", followed by "Oolong". The second table 520 shows topical similarity rankings for the received input term "Fear". The top rankings include the disambiguation page for "Fear", "Horror and terror", "Fear (1996 film)", and the disambiguation page for "Terror". As can be seen from the tables, the process picks up not only semantically-related concepts, but also artifacts of science, medicine, music, film, art, popular culture, and higher-order topics. In some embodiments, topical similarity rankings or determinations are used to compare one phrase, word, or concept to another in order to determine unconscious meaning.

FIG. 6 illustrates an example of a computer system that can be used with various embodiments. For instance, the computer system 400 can be used to implement first processing device 104, second processing device 106, and/or controller 108 according to various embodiments described above. In addition, the computer system 600 shown can represent a computing system on a mobile device or on a computer or laptop, etc. According to particular example embodiments, a system 600 suitable for implementing particular embodiments of the present invention includes a processor 601, a memory 603, an interface 611, and a bus 615 (e.g., a PCI bus). The interface 611 may include separate input and output interfaces, or may be a unified interface supporting both operations. When acting under the control of appropriate software or firmware, the processor 601 is responsible for tasks such as closed loop control. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method of extracting unconscious meaning from media corpora, comprising:
receiving a corpora from one or more media databases;
extracting a phrase from the corpora;
disambiguating the phrase, wherein the disambiguating the phrase is performed via a vector-assisted model and an additional input;
selecting one or more criteria to be used for phrase analysis;
analyzing the phrase to extract unconscious meaning based on the one or more criteria, the analyzing the phrase comprising:
retrieving engagement data based on the criteria, wherein the criteria determines a demographic of the engagement data to be retrieved; and
determining the unconscious meaning of the phrase based, at least in part, on the engagement data; and
providing results of the phrase analysis to a client device, wherein the results include findings of unconscious meaning for the phrase.

2. A method as recited in claim 1 further comprising:
analyzing the phrase for semantic or semiotic meaning.

3. A method as recited in claim 1 further comprising:
analyzing the phrase for similarity relative to a set of training phrases by applying lenses to the phrases.

4. A method as recited in claim 3 wherein vector-based natural language processing model is used for machine learning.

5. A method as recited in claim 4 further comprising utilizing neighborhoods and hierarchical sources of information.

6. A method as recited in claim 1 wherein the one or more criteria comprises one or more of demographic criteria, product categories, brand keys, and geographical culture.

7. A method as recited in claim 1 wherein extracting a phrase further comprises using a vector-based natural language processing model.

8. A method as recited in claim 1 further comprising:
   extracting one or more metaphors from the phrase analysis; and
   providing the one or more metaphors to the client device.

9. A method as recited in claim 1 wherein a phrase is one of text, audio segment, video segment, concepts, ideas, memes, engrams, and emojis.

10. A method as recited in claim 1, wherein the engagement data is data associated with one or more social media platforms.

11. A method as recited in claim 1, wherein the additional input is synset data.

* * * * *